(12) United States Patent
Moallem et al.

(10) Patent No.: US 8,892,794 B2
(45) Date of Patent: *Nov. 18, 2014

(54) USING CENTRAL DIRECT MEMORY ACCESS (CDMA) CONTROLLER TO TEST INTEGRATED CIRCUIT

(75) Inventors: Maziar H. Moallem, Cupertino, CA (US); Richard F. Avra, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/553,301

(22) Filed: Jul. 19, 2012

(65) Prior Publication Data

US 2012/0290881 A1    Nov. 15, 2012

Related U.S. Application Data

(63) Continuation of application No. 12/607,201, filed on Oct. 28, 2009, now Pat. No. 8,250,250.

(51) Int. Cl.
*G06F 13/12*    (2006.01)
*G06F 11/25*    (2006.01)

(52) U.S. Cl.
CPC ...................................... *G06F 11/25* (2013.01)
USPC .......................................................... 710/62

(58) Field of Classification Search
None
See application file for complete search history.

(56) References Cited

U.S. PATENT DOCUMENTS

| | | | |
|---|---|---|---|
| 5,333,274 A * | 7/1994 | Amini et al. ..................... | 714/50 |
| 5,621,883 A | 4/1997 | Thoulon et al. | |
| 5,668,815 A * | 9/1997 | Gittinger et al. .............. | 714/719 |
| 6,178,533 B1 | 1/2001 | Chang | |
| 6,898,734 B2 * | 5/2005 | Kapoor et al. .................. | 714/25 |
| 7,350,109 B2 * | 3/2008 | Barr et al. ....................... | 714/27 |
| 2003/0115385 A1 * | 6/2003 | Adamane et al. ............... | 710/22 |
| 2005/0166103 A1 * | 7/2005 | Gupta et al. ................ | 714/718 |
| 2005/0193256 A1 * | 9/2005 | Moyer ............................. | 714/30 |
| 2006/0010267 A1 * | 1/2006 | Abullarade et al. ............. | 710/62 |
| 2008/0222317 A1 * | 9/2008 | Go et al. .......................... | 710/22 |
| 2009/0150575 A1 * | 6/2009 | Madruga et al. ................ | 710/25 |

OTHER PUBLICATIONS

Cha et al., "Direct DMA Tester Control and Data Transfer," IP.com, pp. 1-3, 2005.

* cited by examiner

*Primary Examiner* — Henry Tsai
*Assistant Examiner* — Aurangzeb Hassan
(74) *Attorney, Agent, or Firm* — Lawrence J. Merkel; Meyertons, Hood, Kivlin, Kowert & Goetzel, P.C.

(57) ABSTRACT

In an embodiment, an integrated circuit includes a direct memory access (DMA) controller configured to perform DMA operations between peripheral components of the integrated circuit and/or a memory to which the integrated circuit is configured to be coupled. Combinations of memory-to-memory, memory-to-peripheral, and peripheral-to-memory operations may be used. The DMA controller may be programmed to perform a number of DMA operations concurrently. The DMA operations may be programmed and performed as part of testing the integrated circuit during design and/or manufacture of the integrated circuit. The DMA operations may cause many of the components in the integrated circuit to be busy performing various operations. In some embodiments, programmed input/output (PIO) operations may also be performed while the DMA operations are in progress. In some embodiments, various parameters of the DMA operations and/or PIO operations may be randomized.

20 Claims, 4 Drawing Sheets

USING CENTRAL DIRECT MEMORY ACCESS (CDMA) CONTROLLER TO TEST INTEGRATED CIRCUIT

PRIORITY INFORMATION

This application is a continuation of U.S. patent application Ser. No. 12/607,201, filed Oct. 28, 2009 and now U.S. Pat. No. 8,250,250.

BACKGROUND

1. Field of the Invention

This invention is related to the field of integrated circuits and, more particularly, to testing integrated circuits.

2. Description of the Related Art

As the number of transistors that can be incorporated into an integrated circuit continues to increase, the complexity of the integrated circuit increases. For example, system-on-a-chip (SOC) implementations can include one or more processors and a variety of peripherals, all integrated onto one semiconductor substrate as an integrated circuit. The peripherals can be in various states of operation at the same time that the processor is performing numerous other operations. The number of possible states in the SOC, all of which must generally provide correct operation, increases exponentially with complexity. Such complexity must be tested during the design and manufacture of the integrated circuit to provide reasonable assurance that the integrated circuit will function as designed and that the design is correct.

SUMMARY

In an embodiment, an integrated circuit includes a direct memory access (DMA) controller configured to perform DMA operations between one or more peripheral components of the integrated circuit and/or a memory to which the integrated circuit is configured to be coupled. Combinations of memory-to-memory, memory-to-peripheral, and/or peripheral-to-memory DMA operations may be used. The DMA controller may be programmed to perform a number of DMA operations concurrently, which may cause a significant amount of operation within the integrated circuit. Many states of the integrated circuit may be arrived at during the DMA operations, which may test operation of the integrated circuit. The DMA operations may be programmed and performed as part of testing the integrated circuit during design and/or manufacture of the integrated circuit, attempting to detect flaws in the logical design and/or flaws in the electrical operation of the integrated circuit. Additionally, components coupled to the integrated circuit, such as memory components, may be tested using the DMA testing strategy. The DMA operations may cause many of the components in the integrated circuit to be busy performing various operations, which may stress the design of the integrated circuit. In some embodiments, programmed input/output (PIO) operations may also be performed while the DMA operations are in progress, further stressing the components of the integrate circuit. In some embodiments, various parameters of the DMA operations and/or PIO operations may be randomized, which may further enhance the testing of the various components involved in the DMA operations and/or PIO operations.

BRIEF DESCRIPTION OF THE DRAWINGS

The following detailed description makes reference to the accompanying drawings, which are now briefly described.

Figure 1:
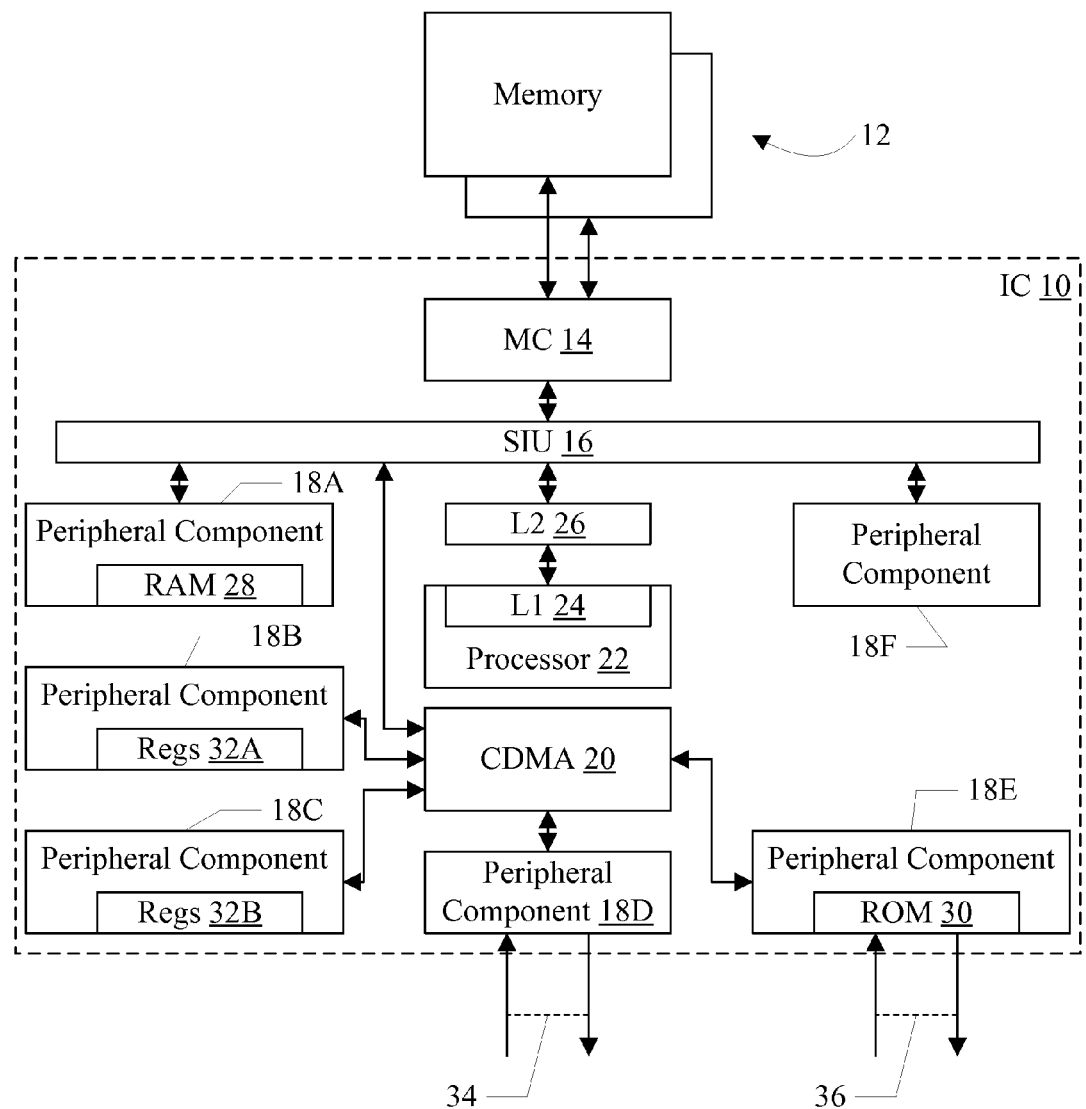
FIG. 1 is a block diagram of one embodiment of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an integrated circuit 10 coupled to external memory 12 is shown. In the illustrated embodiment, the integrated circuit 10 includes a memory controller 14, a system interface unit (SIU) 16, a set of peripheral components such as components 18A-18F, a central DMA (CDMA) controller 20, a processor 22 including a level 1 (L1) cache 24, and a level 2 (L2) cache 26. One or more of the peripheral components may include memories, such as the random access memory (RAM) 28 in the component 18A and the read-only memory (ROM) 30 in the component 18E. One or more peripheral components 18A-18F may also include registers (e.g. registers 32A in the component 18B and the registers 32B in the components 18C in FIG. 1). The memory controller 14 is coupled to a memory interface to which the memory 12 may be coupled, and is coupled to the SIU 16. The peripheral components 18A and 18F, the CDMA controller 20, and the L2 cache 26 are also coupled to the SIU 16 in the illustrated embodiment. The L2 cache 26 is coupled to the processor 22, and the CDMA is coupled to the components 18B-18E. One or more peripheral components 18A-18F may be coupled to external interfaces as well, such as the peripheral components 18D and 18E.

The CDMA controller 20 may be configured to perform DMA operations between the memory 12 and/or various peripheral components 18A-18F. Particularly, in the illustrated embodiment, the CDMA controller 20 may be configured to perform DMA operations between the memory 12 and/or peripheral components 18B-18E. The peripheral components 18A and 18F may be coupled to the SIU 16 directly and may perform their own DMA transfers to/from memory 12, as needed. The peripheral components 18A and 18F may include their own DMA controllers, for example. In other embodiments, all peripheral components may perform transfers through the CDMA controller 20. Various embodiments may include any number of peripheral components coupled through the CDMA controller 20 and/or directly to the SIU 16.

The processor 22 (and more particularly, instructions executed by the processor 22) may program the CDMA controller 20 to perform DMA operations. Various embodiments may program the CDMA controller 20 in various ways. For example, DMA descriptors may be written to the memory 12, describing the DMA operations to be performed, and the CDMA controller 20 may include registers that are programmable to locate the DMA descriptors in the memory 12. The DMA descriptors may include data indicating the source and target of the DMA operation, where the DMA operation transfers data from the source to the target. The size of the DMA transfer (e.g. number of bytes) may be indicated in the descriptor. Termination handling (e.g. interrupt the processor, write the descriptor to indicate termination, etc.) may be specified in the descriptor. Multiple descriptors may be created for a DMA channel, and the DMA operations described in the descriptors may be performed as specified. Alternatively, the CDMA controller 20 may include registers that are programmable to describe the DMA operations to be performed, and programming the CDMA controller 20 may include writing the registers.

Generally, a DMA operation may be a transfer of data from a source to a target that is performed by hardware separate from a processor that executes instructions. The hardware may be programmed using instructions executed by the processor, but the transfer itself is performed by the hardware independent of instruction execution in the processor. At least one of the source and target may be a memory. The memory may be the system memory (e.g. the memory 12), or may be an internal memory in the integrated circuit 10, in some embodiments. For example, a peripheral component 18A-18F may include a memory that may be a source or target. In the illustrated embodiment, the peripheral component 18A includes RAM 28 that may be a source or target of a DMA operation. The peripheral component 18E includes the ROM 30 that may be a source of a DMA operation. Some DMA operations may have memory as a source and a target (e.g. a first memory region in the memory 12 may store the data to be transferred and a second memory region may be the target to which the data may be transferred). Such DMA operations may be referred to as "memory-to-memory" DMA operations or copy operations. Other DMA operations may have a peripheral component as a source or target. The peripheral component may be coupled to an external interface on which the DMA data is to be transferred or on which the DMA data is to be received. For example, the peripheral components 18D and 18E may be coupled to interfaces onto which DMA data is to be transferred or on which the DMA data is to be received.

The CDMA controller 20 may support multiple DMA channels. Each DMA channel may be programmable to perform a DMA via a descriptor, and the DMA operations on the DMA channels may proceed in parallel. Generally, a DMA channel may be a logical transfer path from a source to a target. Each channel may be logically independent of other DMA channels. That is, the transfer of data on one channel may not logically depend on the transfer of data on another channel. If two or more DMA channels are programmed with DMA operations, the CDMA controller 20 may be configured to perform the transfers concurrently. For example, the CDMA controller 20 may alternate reading portions of the data from the source of each DMA operation and writing the portions to the targets. The CDMA controller 20 may transfer a cache block of data at a time, alternating channels between cache blocks, or may transfer other sizes such as a word (e.g. 4 bytes or 8 bytes) at a time and alternate between words. Any mechanism for supporting multiple DMA operations proceeding concurrently may be used.

The CDMA controller 20 may include buffers to store data that is being transferred from a source to a destination, although the buffers may only be used for transitory storage. Thus, a DMA operation may include the CDMA controller 20 reading data from the source and writing data to the destination. The data may thus flow through the CDMA controller 20 as part of the DMA operation. Particularly, DMA data for a DMA read from the memory 12 may flow through the memory controller 14, over the SIU 16, through the CDMA controller 20, to the peripheral component 18A-18F (and possibly on the interface to which the peripheral component is coupled, if applicable). Data for a DMA write to memory may flow in the opposite direction. DMA read/write operations to internal memories may flow from the peripheral component 18A-18F, over the SIU as needed, through the CDMA controller 20, to the other peripheral component involved in the DMA operation.

In one embodiment, instructions executed by the processor 22 may also communicate with one or more of the peripheral components 18A-18F and/or the various memories such as the memory 12, the RAM 28 or the ROM 30 using read and/or write operations referred to as programmed input/output (PIO) operations. The PIO operations may have an address that is mapped by the integrated circuit 10 to a peripheral component 18A-18F (and more particularly, to a register or other readable/writeable resource such as the RAM 28 or the ROM 30 in the component). PIO operations directed to the memory 12 may have an address that is mapped by the integrated circuit 10 to the memory 12. Alternatively, the PIO operation may be transmitted by the processor 22 in a fashion that is distinguishable from memory read/write operations (e.g. using a different command encoding then memory read/write operations on the SIU 16, using a sideband signal or control signal to indicate memory vs. PIO, etc.). The PIO transmission may still include the address, which may identify the peripheral component 18A-18F (and the addressed resource) or the memory 12 within a PIO address space, for such implementations.

In one embodiment, PIO operations may use the same interconnect as the CDMA controller 20, and may flow through the CDMA controller 20, for peripheral components that are coupled to the CDMA controller 20. Thus, a PIO operation may be issued by the processor 22 onto the SIU 16 (through the L2 cache 26, in this embodiment), to the CDMA controller 20, and to the targeted peripheral component.

Alternatively, the peripheral components 18B-18E may be coupled to the SIU 16 for PIO communications. PIO operations to peripheral components 18A and 18F may flow to the components directly from the SIU 16 (i.e. not through the CDMA controller 20) in one embodiment.

Generally, a peripheral component may comprise any desired circuitry to be included on the integrated circuit 10 with the processor. A peripheral component may have a defined functionality and interface by which other components of the integrated circuit 10 may communicate with the peripheral component. For example, peripheral components may include video components such as display controllers, graphics processors, etc.; audio components such as digital signal processors, mixers, etc.; networking components such as an Ethernet media access controller (MAC) or a wireless fidelity (WiFi) controller; controllers to communicate on various interfaces such as universal serial bus (USB), peripheral component interconnect (PCI) or its variants such as PCI express (PCIe), serial peripheral interface (SPI), flash memory interface, etc.

As mentioned previously, one or more of the peripheral components 18A-18F may include registers (e.g. registers 32A-32B) that may be addressable via PIO operations. The registers may include configuration registers that configure programmable options of the peripheral components, status registers that may be read to indicate status of the peripheral components 18A-18F, etc. Similarly, peripheral components may include memories such as the RAM 28 or the ROM 30. RAMs may store data to be operated upon by the peripheral component 18A-18F or generated by the peripheral component 18A-18F, data being buffered for transmission on an interface or received from an interface, etc. ROMs may store data used by the peripheral that does not change, code to be executed by an embedded processor within the peripheral component 18A-18F, etc.

In one embodiment, one or more interfaces to which peripheral components are coupled may be connected in an external loopback mode for use with the CDMA code described in more detail below to test the integrated circuit 10. For example, the interfaces to which the peripheral blocks 18D and 18E are coupled may be connected in loopback mode (dotted lines 34 and 36). In one embodiment, one or more SPI interfaces may be connected in loopback mode for testing using the CDMA code. Loopback mode may be implemented on symmetrical interfaces that have a transmit section and a receive section that have the same signal definitions. To connect an interface in loopback mode, the signals of the transmit section may be connected to the corresponding signals of the receive section. Thus, when a transmission is performed by the peripheral component on the transmit section of the interface, the transmission returns on the receive section.

The processor 22 may implement any instruction set architecture, and may be configured to execute instructions in that instruction set architecture. The processor 22 may employ any microarchitecture, including scalar, superscalar, pipelined, superpipelined, out of order, in order, speculative, non-speculative, etc., or combinations thereof. The processor 22 may include circuitry, and optionally may implement microcoding techniques. In the illustrated embodiment, the processor 22 may include an L1 cache 24 to store data and instructions for use by the processor 22. There may be separate L1 data and instruction caches. The L1 cache(s) may have any capacity and organization (set associative, direct mapped, etc.). In the illustrated embodiment, an L2 cache 26 is also provided. The L2 cache 26 may have any capacity and organization, similar to the L1 cache(s).

The SIU 16 may be an interconnect over which the memory controller 14, the peripheral components 18A and 18F, the processor 22 (through the L2 cache 26), the L2 cache 26, and the CDMA controller 20 may communicate. The SIU 16 may implement any type of interconnect (e.g. a bus, a packet interface, point to point links, etc.). The SIU 16 may be a hierarchy of interconnects, in some embodiments.

The memory controller 14 may be configured to receive memory requests from the system interface unit 16. The memory controller 14 may be configured to access memory to complete the requests (writing received data to the memory for a write request, or providing data from the memory 12 in response to a read request) using the interface defined for the attached memory 12. The memory controller 14 may be configured to interface with any type of memory 12, such as dynamic random access memory (DRAM), synchronous DRAM (SDRAM), double data rate (DDR, DDR2, DDR3, etc.) SDRAM, Low Power DDR2 (LPDDR2) SDRAM, RAMBUS DRAM (RDRAM), static RAM (SRAM), etc. The memory may be arranged as multiple banks of memory, such as dual inline memory modules (DIMMs), single inline memory modules (SIMMs), etc. In one embodiment, one or more memory chips are attached to the integrated circuit 10 in a package on package (POP) or chip-on-chip (COC) configuration.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
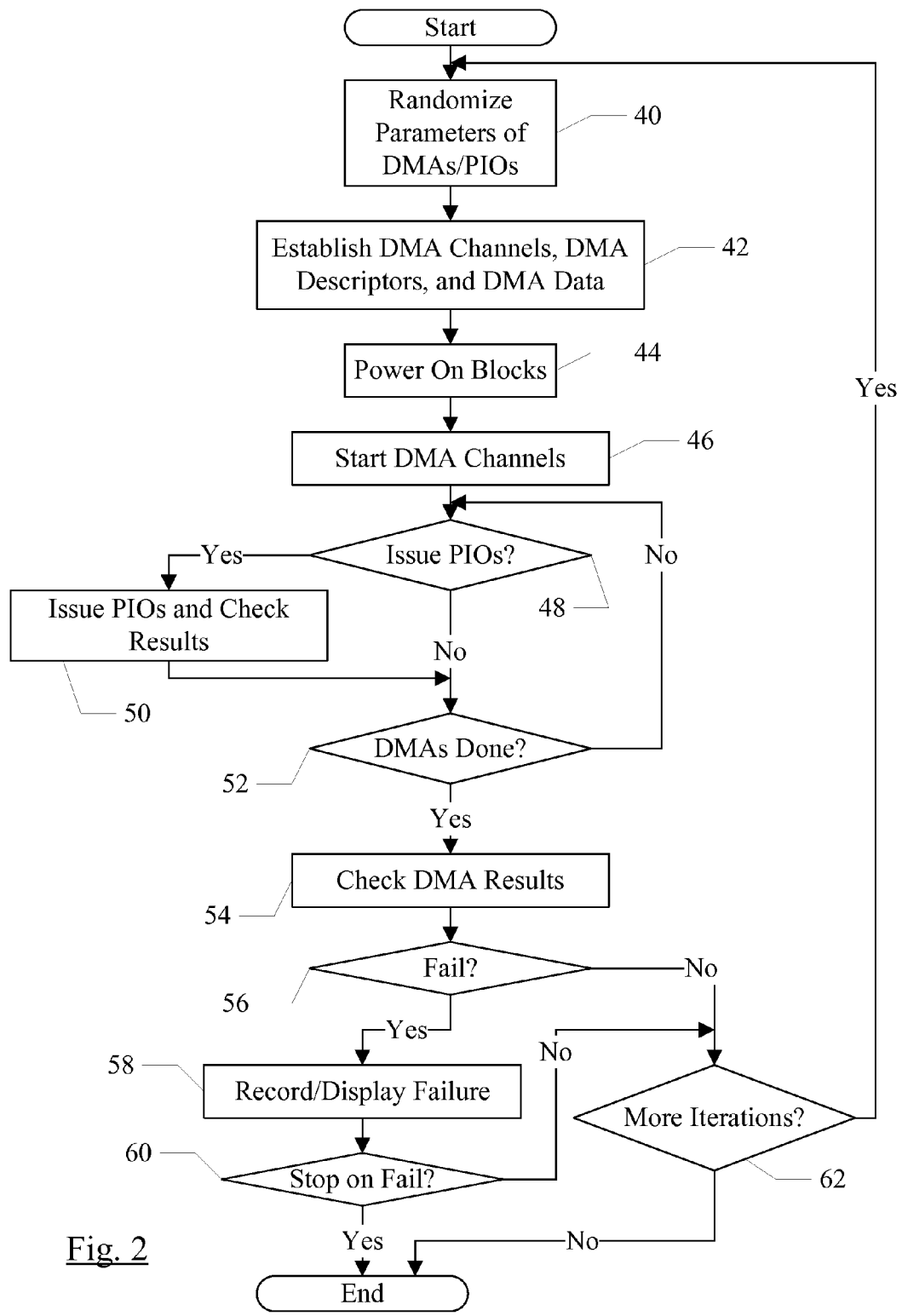
FIG. 2 is a flowchart illustrating one embodiment of central direct memory access (CDMA) code executable on a processor in the integrated circuit.

Turning now to FIG. 2, a flowchart is shown illustrating operation of one embodiment of CDMA code that may be executed by the processor 22 to test the integrated circuit 10. The CDMA code may be loaded into an internal memory of the integrated circuit 10, the caches 24 or 26, and/or the memory 12 during testing of the integrated circuit 10 at any point in the manufacturing process (e.g. at speed board test, burn in, etc.). The CDMA code may also be used in other testing environments, such as field programmable gate array (FPGA) prototyping or simulation environments. While the blocks are shown in a particular order in FIG. 2, other orders may be used. The CDMA code may include instructions which, when executed by the processor 22, may implement the operation illustrated in FIG. 2.

In one embodiment, the CDMA code may ensure that the blocks of the integrated circuit 10 that are used in the DMA operations and/or PIO operations are powered on (block 44). In some embodiments, the integrated circuit 10 may include a power manager configured to power down blocks that are not in use. If a block participates in one of the DMA operations and/or PIO operations programmed by the CDMA code and that block is powered down, that block may be powered up by transmitting a power up command from the processor 22 to the power manager.

The CDMA code may randomize various parameters of the DMA operations and PIO operations that the CDMA code will program for the CDMA controller 20 and that the CDMA code will perform to the peripheral components 18A-18F, respectively (block 40). Any random generation strategy may be used, such as a linear feedback shift register (LFSR), Fast_Tran (a public domain random number generator), etc. It is noted that the random generation strategy may generally be pseudo-random.

Parameters that may be randomized may include one or more of the following: the data transferred in a DMA operation, the size of the DMA operation (e.g. number of bytes), the sources and destinations of the DMA operations, addresses of the DMA operations, number of source and destination data buffers, DMA burst size and width, buffer alignment in memory, injection of halt commands to the CDMA controller 20, stream versus transaction DMA, whether or not to perform PIO operations during the DMA operations, number of PIO operations, targets of PIO operations, etc.

The CDMA code may establish the DMA channels, DMA descriptors, and DMA data for the DMA operations (block 42). The DMA channels may include channels dedicated to memory-to-memory operations (copying data from one region of memory 12 to another region through the CDMA controller 20), channels dedicated to memory-to-peripheral operations, and channels dedicated to peripheral-to-memory operations. Alternatively, a channel may have a variety of DMA operations to various sources/targets prepared for it. The CDMA code may write the data to be transmitted for memory-to-memory or memory-to-peripheral operations to buffers in the memory 12 (where a buffer is a region or area of memory allocated to store DMA data). The CDMA code may also write the descriptors for each DMA channel, specify source, destination, size, etc. The CDMA code may program the channels in the CDMA controller 20 to point to the respective descriptors. For example, there may be a descriptor pointer register for each channel, pointing to a descriptor that has been programmed for that channel. Subsequent descriptors for the channel, if any, may be in consecutive memory locations to the memory locations storing the first descriptor for the channel, or the descriptors may include pointers to the next descriptor.

The data for a peripheral-to-memory DMA operation comes from the peripheral component that is the source of the transfer. In some cases, the source may be an internal memory such as a RAM 28, and the CDMA code may write DMA data to a buffer in the RAM 28 (similar to writing data to the memory 12). In other cases, the source may be an external interface. In the illustrated embodiment, the external interface may be connected in the loopback mode. Accordingly, by pairing a memory-to-peripheral channel with the peripheral-to-memory channel, a DMA transfer may be arranged that transmits data from a first region of memory to the peripheral component, onto the interface, back into the component, and to a second region in the memory 12. The memory-to-peripheral channel may cause the data to be transferred from memory onto the interface. The loopback connection may cause the data to be transmitted back into the peripheral component, and the peripheral-to-memory channel may cause the data to be written to the second region in memory. Accordingly, by pairing the channels, peripheral-to-memory DMA operations may be performed with predictable data results, which can be checked for accuracy. The peripheral components may include internal buffering to store data received on the interface until the data is DMA transferred to memory by the CDMA controller 20.

On the other hand, a memory-to-memory transfer may be programmed on one channel. The source may be a first region of memory 12 and the target may be a second region in the memory 12. The CDMA controller 20 may generate reads from the first regions and writes of the received data to the target regions.

By initializing the DMA data and descriptors using the processor 22, the L1 cache 24 and L2 cache 26 may be tested by the CDMA code as well. That is, the data may initially be cached in one or both of the L1 cache 24 and the L2 cache 26, then flushed to memory to perform the DMA operations. If the L1 cache or L2 cache is not operating properly, the incorrect operation may result and a test failure may be detected.

The CDMA code may initiate the DMA operations on the DMA channels (block 46). Initiating the DMA operations may be performed substantially concurrently for each channel. For example, the DMA channels may be enabled or disabled in a register or registers in the CDMA controller 20. The CDMA code may write the register or registers, enabling the channels involved in the test. If enables are in the same register, the enables may be set via one write operation. If multiple registers are involved, the CDMA code may include consecutive instructions to write the registers. In other embodiments, enables in the descriptors may be written to initiate the DMA operations. Consecutive writes to the DMA descriptor data structures for each channel may be used.

As mentioned previously, the CDMA code may randomly determine if PIO operations will be issued during the time that the DMA operations are being performed. If the random determination is that PIO operations are to be issued (decision block 48, "yes" leg), the CDMA code may issue the PIO operations and check the results of the PIO operations (block 50). If PIO read operations are used, for example, the PIO reads may read registers or memory locations with known contents. Accordingly, the CDMA code may have the values to check for correct completion of the PIO operations. Alternatively, a pair of PIOs (a write followed by a read) may be performed to a register or memory location. The write data may be expected to be returned as the read data.

In either case, the CDMA code may determine if the DMA operations have completed (decision block 52). The determination may be performed in various fashions. For example, the CDMA code may poll the DMA channels to determine if the DMAs are complete. Polling the channels may include reading one or more registers in the CDMA controller 20, for example. The registers may indicate which channels have DMA operations in progress or pending, and the CDMA code may poll for the DMA channels to be idle (no operations pending or in progress). Alternatively, the CDMA controller 20 may write the DMA descriptors to indicate that the corresponding DMA operations are completed. The CDMA code may read the descriptors in memory 12 to determine if the DMA operations are complete.

If the DMA operations have not completed (decision block 52, "no" leg), the CDMA code may again determine if PIO operations are to be issued and issue PIO operations if so (blocks 48 and 50), and then poll the DMA channels again for completion. If the DMA operations have completed (decision block 52, "yes" leg), the CDMA code may check the DMA results for correct completion. For example, memory-to-memory transfers may have a source memory region and a target memory region. The CDMA code may compare the data in the source memory region to the target memory region to determine whether or not the DMA operation completed successfully. Alternatively, the CDMA code may calculate an error detection code over the source data and the target data, and may compare the error detection codes. In yet another alternative, the randomized data for a given DMA transfer may be a relatively small pattern (e.g. a register width) repeated to fill the source region. In such an embodiment, the CDMA code may compare the known pattern to the target region rather than directly compare the source region to the target region.

For memory-to-peripheral transfers (and vice versa), there may also be source and target memory regions for the paired memory-to-peripheral and peripheral-to-memory channels: the source memory region of the memory-to-peripheral channel and the target memory region of the peripheral-to-memory channel. Using the loopback mode on the peripheral's interface, the data in the source memory region should match the target memory region of its pair. Again, the data may be compared or the error detection code may be computed and compared.

If any incorrect data is detected (e.g. in either the PIO results or the DMA results), the CDMA code may indicate the failure (decision block 56, "yes" leg and block 58). For example, the CDMA code may record the failure in a data structure in the memory 12, which may be loaded by a debugger or other test analysis software. Alternatively or in addition, the CDMA code may write a message to a display device indicating the failure and providing data describing the failure (e.g. address, channel, failure, etc.). The CDMA code may support failure modes as well, such as stop on first failure or continue to end of iteration. If stop on first failure is the mode (decision block 60, "yes" leg) the CDMA code may exit. If stop on first failure is not the mode (decision block 60, "no" leg) or no failure was detected (decision block 56, "no" leg), the CDMA code may determine if any additional iterations of the test are to be performed (decision block 62). The CDMA code may be provided with an iteration count when invoked, for example, and may there may be additional iterations if the number of iterations have not yet reached the iteration count. Alternatively, the CDMA code may be provided with a run time parameter, and there may be additional iterations if the run time has not yet been exhausted. If there are additional iterations (decision block 62, "yes" leg), the CDMA code may return to block 40 to begin the next iteration. If there are no more iterations (decision block 62, "no" leg), the CDMA code may exit.

Figure 3:
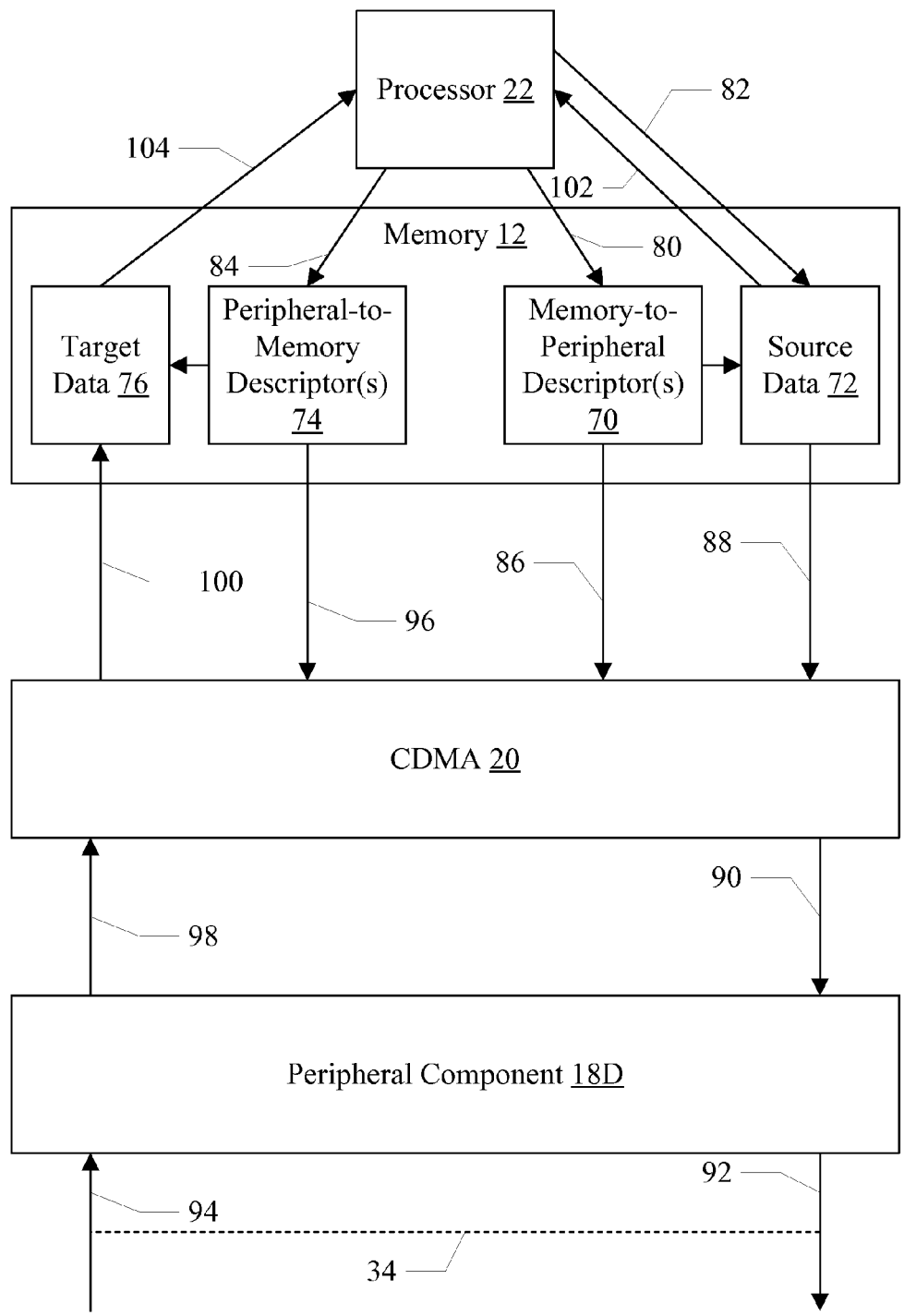
FIG. 3 is a block diagram illustrating an example using loopback and a pair of DMA channels for testing.

Turning now to FIG. 3, a block diagram illustrating one embodiment of the pairing of DMA channels and the use of loopback for a DMA test is shown. As mentioned previously, memory-to-memory DMA tests may be performed on other channels as well, concurrently with the pair of channels illustrated in FIG. 3. The processor 12 may write a memory-to-peripheral descriptor or descriptors 70 and corresponding source data 72 to be transmitted for the memory-to-peripheral channel (arrows 80 and 82, respectively). The descriptor 70 includes a pointer to the source data 72, which may be stored in a region of the memory 12. The descriptor 70 also includes other data describing the DMA operation (e.g. identifying the peripheral component 18D as the target of the transfer, the size, etc.) The processor may also write a peripheral-to-memory descriptor 74, which points to a second region of memory 12 to which the target data 76 of the peripheral-to-memory channel may be written (arrow 84). The peripheral-to-memory descriptor 74 may also include size data and data identifying the peripheral component 18D as the source. The DMA channels may then be enabled, initiating the DMA operation.

The CDMA controller 20 may read the descriptor 70 and begin transferring the source data (arrows 86 and 88, respectively). The CDMA controller 20 may propagate the data to the peripheral component 18D (arrow 90). The peripheral component 18D may transmit the data on the transmit section of the interface (arrow 92), and the loopback connection 34 may cause the data to be received on the receive section of the interface (arrow 94). The peripheral component 18D may buffer the received data.

The CDMA controller 20 may read the descriptor 74 concurrently with the descriptor 72 (arrow 96), and may initiate a DMA read from the peripheral component 18D (arrow 98). The loopback data from the interface may thus be transferred through the CDMA controller 20 to the target data memory region (arrow 100).

When the DMA operations have completed, a copy of the source data 72 should be stored as the target data 76. The processor may read the source data 72 and compare it to the target data 76 to determine if any errors occurred in the transfer (arrows 102 and 104).

As mentioned above, memory-to-memory DMA operations may be performed concurrently as well. The memory-to-memory transfers may generally follow the path from processor 22 creation in the memory 12, through the CDMA controller 20, and back to the memory 12. That is, no peripheral component may be involved (unless either the source or target is a memory within the peripheral component). More particularly, the processor 22 may write the source data 72 for a memory-to-memory transfer, and may generate one or more memory-to-memory descriptors in the memory 12. The memory-to-memory descriptors may include pointers to the source data 72 and to target data regions 76. The CDMA controller 20 may read the memory-to-memory descriptors, read the source data 72, and write the data as the target data 76. The processor 22 may then read the source data 72 and the target data 76 and may check the data to detect success or failure of the memory-to-memory DMA operation.

It is noted that FIG. 3 illustrates the processor writing to the memory 12 and reading from the memory 12 (and more particularly the source data 72, the memory-to-peripheral descriptors 70, the peripheral-to-memory descriptors 74, and the target data 76). However, the data manipulated by the processor 22 may temporarily reside in the L1 cache 24 and/or the L2 cache 26. The processor 22 may flush the data to the memory 12, or some embodiments may implement cache coherency between the L1 cache 24, the L2 cache 26, and the memory 12 to ensure that the correct data is provided when data resides in one or both of the caches. Accordingly, L1 cache 24, L2 cache 26, and the coherence mechanisms, if applicable, may be tested during the DMA operations.

System and Computer Accessible Storage Medium

Figure 4:
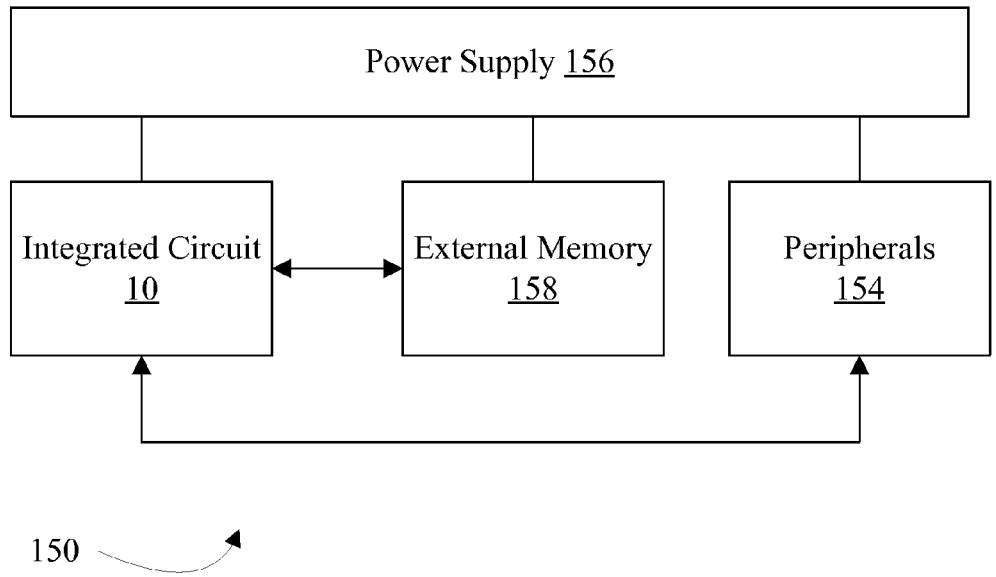
FIG. 4 is a block diagram of one embodiment of a system including the integrated circuit shown in FIG. 1.

Turning next to FIG. 4, a block diagram of one embodiment of a system 150 is shown. In the illustrated embodiment, the system 150 includes at least one instance of an integrated circuit 10 (from FIG. 1) coupled to one or more peripherals 154 and an external memory 158. The external memory 158 may include the memory 12. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM, solid state storage, flash memory, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, Low Power DDR2 (LPDDR2) SDRAM, RAMBUS DRAM, etc. The external memory 158 may include one or more memory modules to which the memory devices are mounted, such as single inline memory modules (SIMMs), dual inline memory modules (DIMMs), etc.

Figure 5:
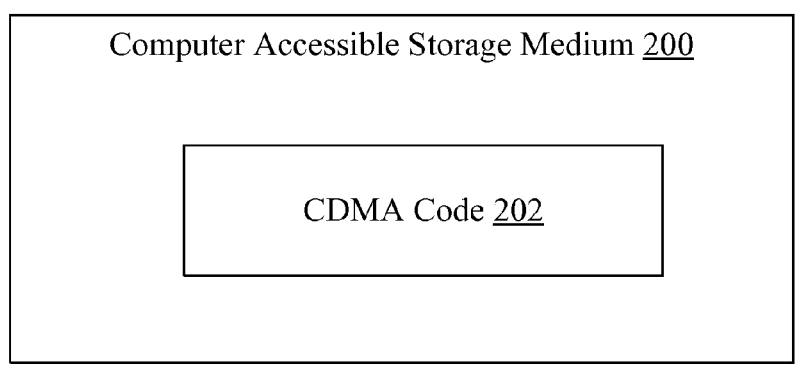
FIG. 5 is a block diagram of one embodiment of a computer accessible storage medium.

Turning now to FIG. 5, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), double data rate (DDR, DDR2, DDR3, etc.) SDRAM, Low Power DDR2 (LPDDR2) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. The computer accessible storage medium 200 in FIG. 5 may store CDMA code 202, which may include the code described above with regard to FIG. 2. Generally, the computer accessible storage medium 200 may store any set of instructions which, when executed, implement a portion or all of the operation shown in FIG. 2. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method comprising:
   establishing a plurality of direct memory access (DMA) operations to be performed in an integrated circuit including a DMA controller, a memory, and one or more peripheral components, wherein each of the plurality of DMA operations is programmed to a different channel of the DMA controller;
   performing the plurality of DMA operations; and
   verifying whether or not the plurality of DMA operations have completed correctly;
   wherein performing the plurality of DMA operations includes performing a first DMA operation configured to transfer first data from the memory to a first peripheral component, wherein the first peripheral component is configured to transmit the first data onto an interface which is connected back to the first peripheral component in a loopback configuration, wherein the first peripheral component is further configured to receive loopback data back from the interface, wherein the interface is symmetrical and includes a transmit section and a receive section, and wherein the loopback configuration comprises connecting signals of the transmit section to corresponding signals of the receive section;
   wherein performing the plurality of DMA operations further includes performing a second DMA operation configured to transfer the loopback data from the first peripheral component to the memory.

2. The method of claim 1, further comprising:
   indicating a test failure responsive to at least one of the plurality of DMA operations not completing correctly.

3. The method of claim 1,
   wherein said verifying comprises verifying that the loopback data transferred from the first peripheral component to the memory is equal to the first data transferred from the memory to the first peripheral component.

4. The method of claim 1, further comprising:
   storing in the memory a first descriptor for the first DMA operation, wherein the first descriptor specifies the memory as a source and the first peripheral component as a target for the first DMA operation; and
   storing in the memory a second descriptor for the second DMA operation, wherein the second descriptor specifies the first peripheral component as a source and the memory as a target for the second DMA operation.

5. The method of claim 4,
   wherein the first descriptor for the first DMA operation includes a pointer to the first data in the memory.

6. A non-transitory computer accessible storage medium storing program instructions which, when executed on a processor in an integrated circuit that includes a direct memory access (DMA) controller, one or more peripheral components, and a memory controller coupled to a memory:
   program a plurality of DMA channels to perform a plurality of DMA operations, wherein a subset of the plurality of DMA operations are between the memory and the one or more peripheral components;
   communicate with the DMA controller to initiate the plurality of DMA operations; and
   verify results of the plurality of DMA operations; wherein initiating the plurality of DMA operations includes initiating a first DMA operation configured to transfer first data from the memory onto a transmit section of an interface of a first peripheral component, wherein the transmit section of the interface is connected to a receive section of the interface in a loopback mode, and wherein the interface is symmetrical, wherein the first peripheral component is configured to receive loopback data back from the receive section of the interface;
   wherein initiating the plurality of DMA operations further includes initiating a second DMA operation configured to transfer the loopback data from the first peripheral component to the memory;
   wherein said verifying the results of the plurality of DMA operations comprises verifying that the loopback data transferred from the first peripheral component to the memory is the same as the first data.

7. The non-transitory computer accessible storage medium of claim 6, wherein, when executed on the processor, the program instructions are further executable to:
   randomize one or more parameters of the plurality of DMA operations using one or more pseudo-random generators.

8. The non-transitory computer accessible storage medium of claim 6,
   wherein initiating the plurality of DMA operations further includes initiating a third DMA operation concurrently with the first DMA operation and the second DMA operation,
   wherein the third DMA operation is a memory-to-memory DMA operation configured to transfer second data from a first region of the memory to a second region of the memory.

9. The non-transitory computer accessible storage medium of claim 6, wherein, when executed on the processor, the program instructions are further executable to:

cause the first peripheral component to perform a programmed input/output (PIO) operation; and
verify a result of the PIO operation.

10. A non-transitory computer accessible storage medium storing a plurality of program instructions which, when executed on a processor in an integrated circuit that includes a direct memory access (DMA) controller, one or more peripheral components, and a memory controller coupled to a memory:
randomize parameters of a plurality of DMA operations, wherein said randomizing includes randomly determining a source and a target for a first DMA operation, wherein the source and the target are selected from the one or more peripheral components and the memory;
program a plurality of DMA channels to perform the plurality of DMA operations with the randomized parameters;
communicate with the DMA controller to initiate the plurality of DMA operations;
randomly determine whether to perform one or more programmed input/output (PIO) operations with the plurality of DMA operations, including randomly determining a target device of a first PIO operation of the one or more PIO operations; verify results of the plurality of DMA operations; and indicate a pass/fail test result responsive to verifying the results.

11. The non-transitory computer accessible storage medium of claim 10, wherein randomly determining the source and the target for the first DMA operation comprises randomly selecting the memory as the source and a particular peripheral component of the one or more peripheral components as the target.

12. The non-transitory computer accessible storage medium of claim 10, wherein randomly determining the source and the target for the first DMA operation comprises randomly selecting a first region of the memory as the source and a second region of the memory as the target.

13. The non-transitory computer accessible storage medium of claim 10, wherein said randomizing further includes randomly generating data to be transferred by the first DMA operation.

14. A method comprising:
determining parameters for a plurality of direct memory access (DMA) operations to be performed in an integrated circuit including a DMA controller, a memory, and one or more peripheral components, wherein the plurality of DMA operations includes a first DMA operation, wherein said determining includes randomly selecting a source and target for the first DMA operation;
performing the plurality of DMA operations using the determined parameters;
determining whether to perform one or more programmed input/output (PIO) operations with the plurality of DMA operations, including randomly determining a target device of a first PIO operation of the one or more PIO operations;
verifying results of the plurality of DMA operations; and
indicating a pass/fail test result responsive to verifying the results.

15. The method of claim 14, wherein the source and the target for the first DMA operation are randomly selected using one or more pseudo-random generators.

16. The method of claim 14, wherein said determining further comprises randomly determining one or more of:
a number of source data buffers used in the first DMA operation; or
a number of destination data buffers used in the first DMA operation.

17. The method of claim 14, wherein said determining further comprises randomly determining a memory alignment for a memory buffer used by the first DMA operation.

18. A system comprising:
one or more processors; and
memory storing program instructions, wherein the program instructions are executable by the one or more processors to perform operations including:
configuring an integrated circuit to perform a plurality of direct memory access (DMA) operations, wherein said configuring includes randomizing parameters of the plurality of DMA operations, wherein said randomizing includes randomly determining a source and a target for a first DMA operation;
randomly determining whether to perform one or more programmed input/output (PIO) operations concurrently with the plurality of DMA operations, and in response to randomly determining that a first PIO operation should be performed concurrently with the plurality of DMA operations, randomly determining a target device of the first PIO operation;
initiating the plurality of DMA operations on the integrated circuit; and
verifying results of the plurality of DMA operations.

19. The system of claim 18,
wherein the integrated circuit includes a memory and one or more peripheral components;
wherein said randomly determining the source and the target for the first DMA operation comprises randomly selecting the memory as the source and a particular peripheral component of the one or more peripheral components as the target.

20. The system of claim 18,
wherein the integrated circuit includes a memory;
wherein said randomly determining the source and the target for the first DMA operation comprises randomly selecting a first region of the memory as the source and a second region of the memory as the target.

* * * * *